United States Patent
Sassow

(10) Patent No.: US 8,678,768 B2
(45) Date of Patent: Mar. 25, 2014

(54) VERTICAL AXIS TURBINE

(71) Applicant: Nicolas W. Sassow, Ringwood (GB)

(72) Inventor: Nicolas W. Sassow, Ringwood (GB)

(73) Assignee: SEaB Energy Ltd., Southampton (GB)

( * ) Notice: Subject to any disclaimer, the term of this patent is extended or adjusted under 35 U.S.C. 154(b) by 0 days.

(21) Appl. No.: 14/012,517

(22) Filed: Aug. 28, 2013

(65) Prior Publication Data

US 2013/0343890 A1 Dec. 26, 2013

Related U.S. Application Data

(60) Continuation of application No. 13/302,060, filed on Nov. 22, 2011, now Pat. No. 8,522,435, which is a division of application No. 12/435,188, filed on May 4, 2009, now Pat. No. 8,061,993.

(51) Int. Cl.
  *F03D 3/06* (2006.01)
  *B21D 53/78* (2006.01)
(52) U.S. Cl.
  USPC ........... 416/176; 416/178; 416/187; 416/211; 416/227 R; 416/227 A; 29/889.7
(58) Field of Classification Search
  USPC ...... 416/176, 177, 197 A, 227 R, 227 A, 237, 416/178, 187, 211; 415/4.2, 4.4, 71, 72, 75, 415/53.1–53.3, 907; 29/889, 889.1, 29/889.2–889.61, 889.7–889.722, 402.19, 29/402.21; 72/257
  See application file for complete search history.

(56) References Cited

U.S. PATENT DOCUMENTS

| 953,891 | A | | 4/1910 | Atkins |
|---|---|---|---|---|
| 1,835,018 | A | | 12/1913 | Darrieus |
| 2,273,756 | A | | 2/1942 | Hoenrkamp |
| 3,918,839 | A | * | 11/1975 | Blackwell et al. ............ 416/175 |
| 4,236,866 | A | | 12/1980 | Zapata Martinez |
| 4,271,668 | A | | 6/1981 | McCormick |
| 5,405,246 | A | | 4/1995 | Goldberg |
| 5,451,137 | A | | 9/1995 | Gorlov |
| 5,451,138 | A | | 9/1995 | Istorik et al. |
| 5,642,984 | A | | 7/1997 | Gorlov |
| 6,959,572 | B2 | | 11/2005 | Lawrence et al. |
| 7,156,609 | B2 | | 1/2007 | Palley |
| 7,726,934 | B2 | | 6/2010 | Cowan |

FOREIGN PATENT DOCUMENTS

| DE | 2948060 A1 | 6/1981 |
|---|---|---|
| DE | 10 2004 041281 A1 | 3/2006 |
| EP | 1413 748 A1 | 4/2004 |
| GB | 2 404 227 A | 1/2005 |
| JP | H05212438 A | 8/1993 |
| WO | 2005061173 A1 | 7/2005 |

* cited by examiner

*Primary Examiner* — Sarang Afzali
(74) *Attorney, Agent, or Firm* — Baker Botts L.L.P.

(57) ABSTRACT

A vertical axis turbine and method of making same is disclosed. The device and method comprise a plurality of blades rotatably disposed around an axis of rotation at a plurality of blade locations, each blade being twisted at a first angle about its longitudinal axis, each blade having its distal ends located a predetermined distance from the axis of rotation, each blade being bent at one or more central locations along the longitudinal axis so the one or more central locations are the same predetermined distance from the axis of rotation as the distal ends, each blade having a foil cross section perpendicular to the axis of rotation for maintaining unidirectional rotation of that blade about the axis of rotation in a fluid flow, and each blade having its longitudinal axis tilted at a second angle with respect to the axis of rotation.

13 Claims, 8 Drawing Sheets

VERTICAL AXIS TURBINE

RELATED APPLICATION

This application claims priority to U.S. patent application Ser. No. 12/435,188, filed on May 4, 2009 (issued on Nov. 22, 2011 as U.S. Pat. No. 8,061,993), entitled Vertical Axis Turbine.

The present invention generally relates to a vertical axis turbine and a method of making the same. More particularly, the present invention relates to a vertical axis turbine for unidirectional rotation under multidirectional fluid flows for use with hydro-pneumatic, hydro, wind, or wave power systems.

BACKGROUND OF THE INVENTION

Reaction turbines have been used for centuries to convert naturally occurring phenomena, such as wind, waves, and other fluid flows, into useful power. While traditional, propeller-type turbines (e.g., a windmill) must be oriented to face the direction of the fluid flow, advances in turbine technology have led to the advent of unidirectional turbines that will rotate in the same direction for many different directions of the fluid flow without changing the orientation of the turbine. Thus, unidirectional turbines are particularly suited for use where a naturally occurring fluid flow is frequently changing directions, such as tidal estuaries or shifting winds. Over time, four basic types of unidirectional turbines have evolved—the Wells turbine, the McCormick turbine, the Darrieus turbine, and the Gorlov turbine.

Wells Turbine

The Wells turbine is a propeller-type turbine that includes a plurality of blades extending radially from a central rotating shaft. By contrast to traditional propeller-type turbines, the blades of the Wells turbine are positioned with their faces perpendicular to the plane of the fluid flow (pitch=0° or pitch=90°) instead of angled into the plane of the fluid flow (0°>pitch<90°). Accordingly, the blades of the Wells turbine can be arranged either with the blades parallel to the rotating shaft (pitch=0°) so that the blades rotate in a plane parallel to the direction of the fluid flow or with the blades perpendicular to the rotating shaft (pitch=90°) so that the blades rotate in a plane perpendicular to the direction of the fluid flow.

By further contrast to traditional propeller-type turbines, the blades of the Wells turbine utilize a symmetrical foil cross-section that allows the blades to maintain the same direction of rotation as long as the fluid flow is perpendicular to the faces of the blades. Thus, when the blades are arranged perpendicular to the rotating shaft (pitch=90°), they will rotate in the same direction for the fluid flow approaching parallel to the shaft, either from front-to-back or back-to-front (i.e., unidirectional rotation in bidirectional flow). And, when the blades are arranged parallel to the rotating shaft (pitch=0°), they will rotate in the same direction for fluid flow coming from any direction perpendicular to the rotating shaft, sweeping 360° around the rotating shaft (i.e., unidirectional rotation in omnidirectional flow). Accordingly, Wells turbines are typically mounted within channels that direct the fluid flow perpendicular to the faces of the blades, particularly with the former blade arrangement.

Although the symmetrical blades of the Wells turbine will maintain the same direction of rotation in the presence of a bi-direction fluid flow, that symmetry results in a larger drag coefficient than traditional propeller-type turbines. That higher drag coefficient results in high noise and relatively low efficiency. Moreover, the effective surface area of the symmetrical blades of the Wells turbine is limited to the outer tips where the linear velocity is greatest, preventing the blades from capturing a substantial amount of the available energy in the fluid flow closer to the rotating shaft. In addition, the Wells turbine has no self-starting capability and must instead use a motor to start the turbine, thereby consuming energy before the turbine can be used to generate energy.

McCormick Turbine

The McCormick turbine was developed in response to the noise and efficiency problems associated with the Wells turbine. By contrast to the Wells turbine, the McCormick turbine includes a plurality of blades extending radially from a central rotating shaft utilizing an asymmetrical, substantially V-shaped, cross-section. Those rotating blades, or rotors, are mounted concentrically between a two sets of fixed blades, or stators, wherein the first set of fixed blades is open to fluid flowing from one direction and the second set of fixed blades is open to fluid flowing in an opposite direction.

The two sets of fixed blades are each positioned to direct the fluid flow into the rotating blades so that the rotating blades rotate in a plane perpendicular to the direction of fluid flow. Each set of fixed blades is configured with an opposite pitch from the set of blades on the opposing side of the rotating blades so that the rotating blades will rotate in the same direction regardless of which side of the rotating blades the fluid flow enters the turbine. Accordingly, McCormick turbines are typically mounted within channels that direct fluid flow perpendicular to the plane of rotation. Because the McCormick turbine will rotate in the same direction in the presence of bi-directional flow (i.e., unidirectional rotation in bi-directional flow), it is particularly suited for harnessing power from natural phenomena that regularly oscillate back and forth, such as wave energy.

Arrangement of the blades of the McCormick turbine allow it to be more efficient and have a smaller diameter than the Wells turbine. Thus, the McCormick turbines are quieter than the Wells turbine. That smaller diameter, however, significantly reduces the rotational speed of the McCormick turbine. The generator gearing required to compensate for that lower rotational speed is complex and expensive to manufacture.

Darrieus Turbine

The Darrieus turbine includes a plurality of blades running lengthwise along a central, vertical rotating shaft. The blades may be rectilinear, parallel to the rotating shaft, and attached to the rotating shaft at their distal ends by struts extending radially from the rotating shaft (i.e., a giromill). Or, the blades may be curved in a semicircular shape extending away from the rotating shaft with their distal ends attached at or on the rotating shaft (i.e., a troposkien turbine). The blades of the Darrieus turbine have a symmetrical foil cross-section and are disposed at a distance away from the rotating shaft so that the fluid flow can pass between the blades and the rotating shaft. That configuration allows the blades to rotate in the same direction for the fluid flow coming from any direction perpendicular to the rotating shaft, sweeping 360° around the rotating shaft (i.e., unidirectional rotation in omnidirectional flow).

In addition, because the fluid flow is allowed to pass between the blades and the rotating shaft of the Darrieus turbine, the oncoming fluid flow from the movement of the blades will create a varying force that will be vectorially added to the force created by the fluid flow moving perpendicular to the blade. The resulting added force will always point obliquely forward along the line-of-action of each blade, creating a positive torque on the rotating shaft and further helping it to rotate in the direction it is already traveling. Thus, a Darrieus turbine can have a rotational speed that is unrelated to the speed of the fluid flow and is usually many times faster.

Although the blades of the Darrieus turbine allow it to rotate at a rate higher than the fluid flow, disposing the blades away from the rotating shaft causes each blade to generate a maximum amount of torque at two different points in rotation—at the front and back of the turbine—due to the changing accelerations of the blades as they pass between high and low pressure zones in the fluid. Those changes in torque can cause strong pulsations that lower the efficiency of the turbine. Moreover, those pulsations can result in catastrophic failure of the turbine at certain wind speeds. Accordingly, Darrieus turbines typically require complicated guy wires systems to stabilize the blades and mechanical brakes or other speed control devices to keep them operating at safe speeds. Darrieus turbines also have no of self-starting capability.

Gorlov Turbine

The Gorlov turbine was developed in response to the vibration and efficiency problems associated with the Darrieus turbine. The Gorlov turbine modifies the Darrieus turbine by arranging the symmetrical foil blades in a helical configuration around a central, vertical rotating shaft rather than running them lengthwise along the rotating shaft. Thus, the blades of the Gorlov turbine are in the shape of a helix running diagonally around a cylinder. By running diagonally with respect to the rotating shaft as they curve around the shaft instead of running in line with the shaft as in the Darrieus turbine, at least a portion of each blade of the Gorlov turbine is always positioned perpendicular to the fluid flow, which provides a more continuous speed of rotation without the accelerations and decelerations caused by the blades passing between high and low pressure zones in the fluid. Moreover, each point on the blade moves in a circular path around the rotating shaft at approximately the same distance from the rotating shaft, which provides a more continuous torque curve. Accordingly, the blades of the Gorlov turbine generate less vibration and noise than a Darrieus turbine.

Although the Gorlov turbine generates a smoother torque curve than the Darrieus turbine, its helical blade shapes are complex compound curves that require the use of sophisticated manufacturing techniques, such as numerically-controlled laser cutting and composite molding and casting. Those techniques can be prohibitively expensive. Accordingly, at least one designer, Igor Palley, has attempted to approximate the helical blade design of the Gorlov patent using conventional manufacturing techniques. Palley approximates a helical blade by making several different, discrete straight sections twisted about their own axes and joining those sections in a curved manner. The more twisted, straight sections that are formed and joined in a curved manner, the closer the blade formed by those sections approximates the helical blade of the Gorlov turbine.

Despite simplifying the shape of the Gorlov turbine blades to some degree, the manufacture of Palley's approximated helical blades can also be prohibitively expensive. In addition to requiring that a large number of different, discrete straight sections be individually twisted for each blade, the offset of each section required to approximate a helix requires large computational facilities and a significant amount of skill in manufacturing and assembly. Accordingly, there remains a need for a quiet, efficient, unidirectional turbine that can operate at high speeds with minimal vibrations and that is easy and inexpensive to maintain and manufacture.

SUMMARY OF THE INVENTION

Accordingly, to solve at least the above problems and/or disadvantages described above, and to provide at least the advantages described below, a non-limiting object of the present invention is to provide a system and method of making a vertical axis turbine comprising a plurality of blades rotatably disposed around an axis of rotation at a plurality of blade locations, each blade being twisted at a first angle about its longitudinal axis, each blade having its distal ends located a predetermined distance from the axis of rotation, each blade being bent at one or more central locations along the longitudinal axis so the one or more central locations are the same predetermined distance from the axis of rotation as the distal ends, each blade having a foil cross section perpendicular to the axis of rotation for maintaining unidirectional rotation of that blade about the axis of rotation in a fluid flow, and each blade having its longitudinal axis tilted at a second angle with respect to the axis of rotation.

Those and other objects of the invention, as well as many of the intended advantages thereof, will become more readily apparent when reference is made to the following description, taken in conjunction with the accompanying drawings.

DETAILED DESCRIPTION OF THE EXEMPLARY EMBODIMENTS

The present invention provides a vertical axis turbine that will rotate in the same direction for any fluid flow coming from any direction that is perpendicular to the rotating shaft, thereby sweeping 360° around the rotating shaft (i.e., unidirectional rotation in omnidirectional flow). Thus, the vertical axis turbine of the present invention is particularly suited for fluid flows, such as wind and water, that will naturally change direction while remaining parallel to the surface from which the rotating shaft of the vertical axis turbine extends (e.g., parallel to the ground or the ocean floor). And, because the vertical axis turbine of the present invention will rotate in the same direction for any fluid flow perpendicular to the rotating axis, it need not be placed in a channel for directing fluid flow in a specific direction across its blades. Moreover, the vertical axis turbine of the present invention is quiet and efficient, operates at high speeds with minimal vibration, and is easy and inexpensive to maintain and manufacture.

Figure 1:
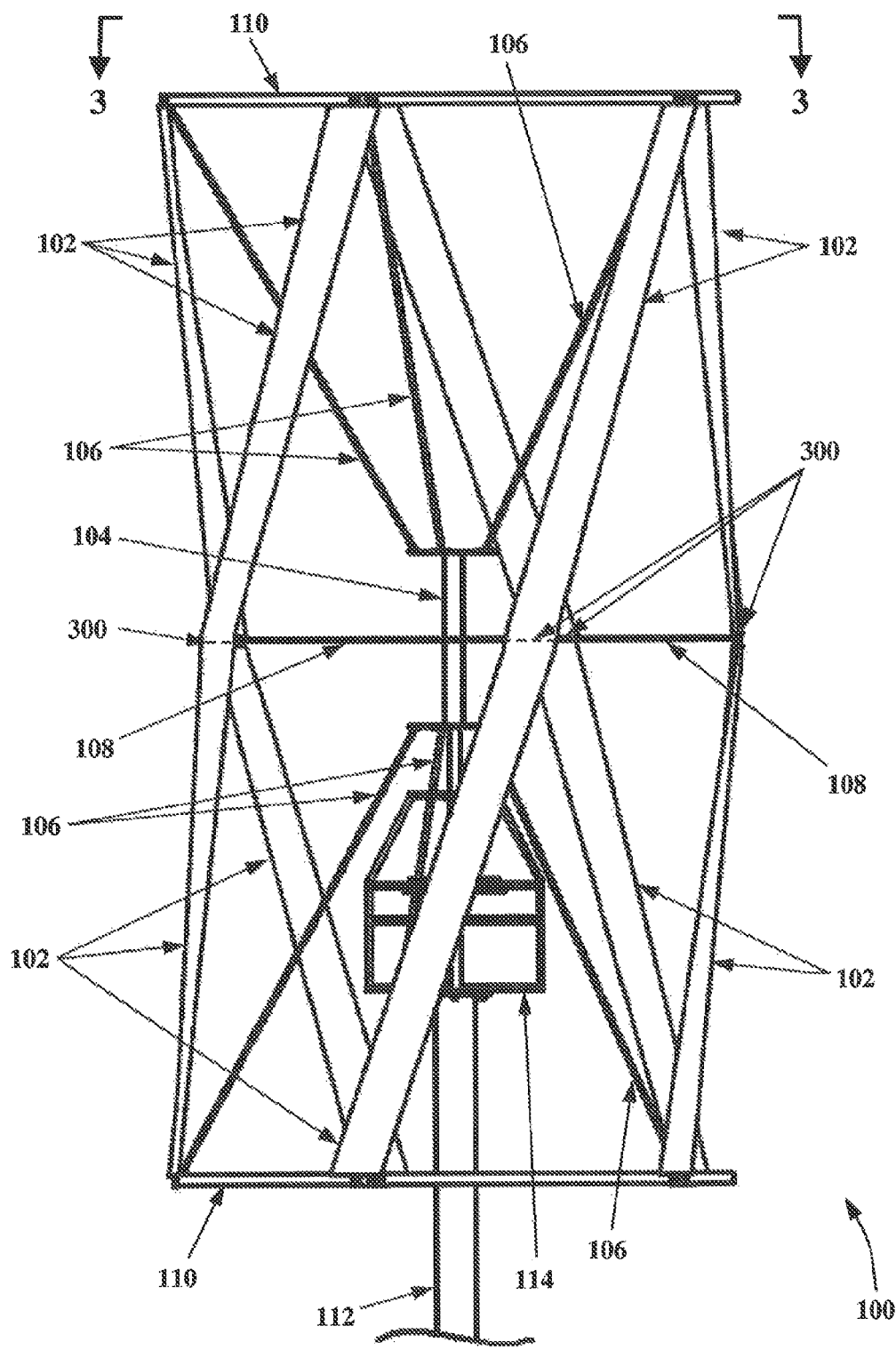
FIG. 1 is an elevational view illustrating a vertical axis turbine according to a non-limiting exemplary embodiment of the present invention.
Figure 2:
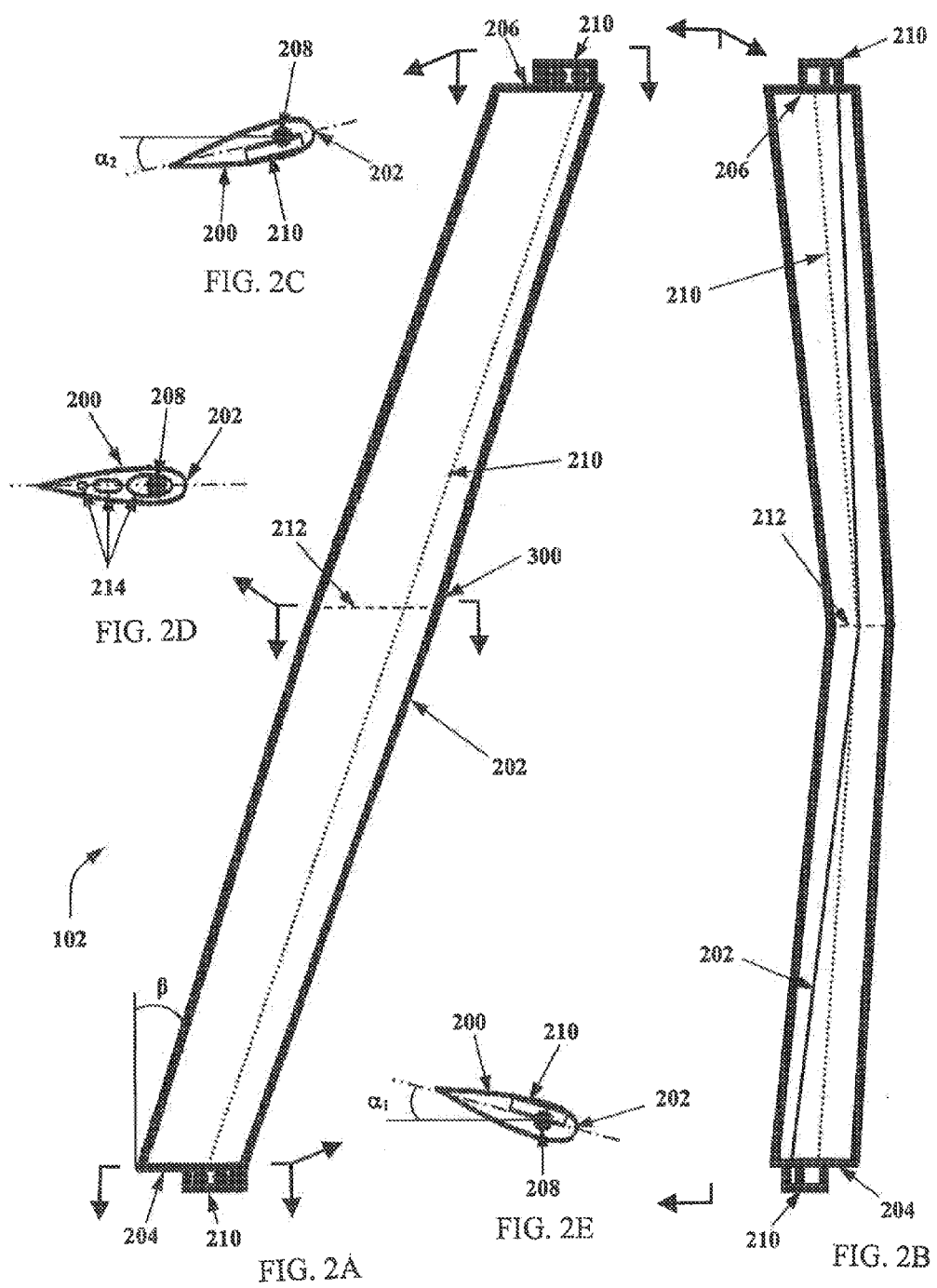
FIG. 2A is a front elevational view illustrating a blade according to the vertical axis turbine in FIG. 1.
FIG. 2B is a side elevational view of the blade illustrated in FIG. 2A.
FIGS. 2C-2E are sectional views of the blade illustrated in FIG. 2A.

Reference will now be made in detail to non-limiting embodiments of the present invention by way of reference to the accompanying drawings, wherein like reference numerals refer to like parts, components and structures. Turning to the drawings, FIG. 1 illustrates a non-limiting exemplary embodiment of a vertical axis turbine 100 according to the present invention. The vertical axis turbine 100 includes a plurality of blades 102 attached to a rotating shaft 104, each of the blades 102 being equally spaced from each other in a substantially circular pattern about the rotating shaft 104. The energy that can be generated from the vertical axis turbine 100 is proportional to its frontal rectangular area, which is equal to the product of the diameter of the circular pattern of blades 102 and the overall vertical height of the blades 102. Thus, the blades 102 should be spaced radially as far from the rotating shaft 104 as is practicable to capture the greatest amount of energy from a fluid flow.

Figure 8:
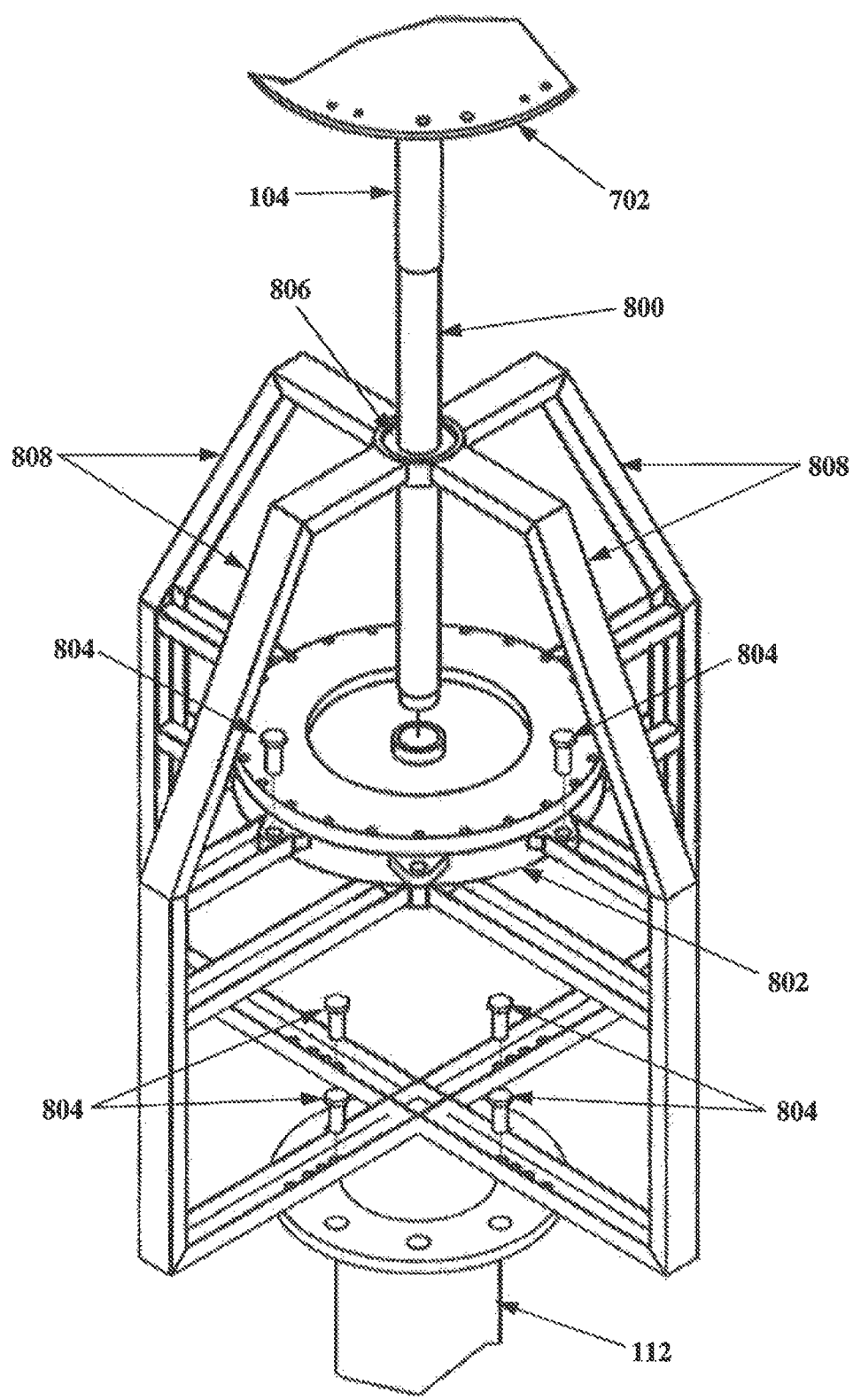
FIG. 8 is an orthogonal view illustrating an engagement end of the rotating shaft illustrated in FIG. 1.

The blades 102 are attached to the rotating shaft 14 by a plurality of angled struts 106 and horizontal struts 108 extending radially from the rotating shaft 104. The blades 102 may also be attached to each other at their distal ends 204 and 206 for additional structural support by a pair of parallel discs or a plurality of horizontal struts 110. The rotating shaft 104 is rotatably disposed on a fixed mast 112 of substantially any suitable length required to locate the blades 102 of the vertical axis turbine 100 in a fluid flow. A generator housing frame 114 is also attached to the fixed mast 112 and is configured to couple the rotating shaft 104 to a direct drive generator 802 (FIG. 8).

As FIGS. 2A-2E illustrate, each blade 102 on the vertical axis turbine 100 has a symmetrical foil cross-section 200 configured to lie in a plane substantially parallel to the direction of fluid flow (e.g., parallel to the ground or the ocean floor) so that the leading edge 202 of the cross-section 200 of each blade 102 travels in a path perpendicular to the rotating shaft 104. The blades 102 may also be constructed so the foil cross-section 200 is asymmetric if required to better maximize the efficiency of the vertical axis turbine 100. With either a symmetric or asymmetric foil cross-section 200, the shape of the cross-section 200 creates two a forces one the blade— one force from the fluid flow moving perpendicular to the cross-section 200 of the blade 102 and a second force from the oncoming fluid flow as the blade 102 rotates through that fluid flow—wherein the two forces are vectorially added to each other. The vector of the resulting added force will always point obliquely forward along the line-of-action of each blade, creating a positive torque on the rotating shaft and further helping it to rotate in the direction it is already traveling.

Each blade 102 is also twisted about its longitudinal axis, preferable the center of pressure 208 (dotted line in FIGS. 2A and 2B) of each cross-section 200 of the blade 102, so that one distal end 204 of the blade 102 is rotated a predetermined angle ($\alpha_1+\alpha_2$) with respect to the other distal end 206 of the blade 102. The leading edge 202 of each blade 102 remains substantially straight such that a continuous straight line can be drawn across the leading edge 202 from the one distal end 204 of the blade 102 to the other distal end 206 of the blade 102. Thus, when the blades 102 are installed on the rotating shaft 104, the center of pressure 208 at one end of the blade 202 will be the same distance from the rotating shaft 104 as the center of pressure 208 at the other end 206 of the blade 102. Maintaining the center of pressure 208 at the same distance from the rotating shaft 104 at the ends of the blade 102 helps minimize changes in torque at the rotating shaft 104.

An attachment flange 210 is provided at each distal end 204 and 206 of the blade 102 for attaching the blades 102 to each other and/or to the struts 106-110. The attachment flanges 210 are preferably located at the distal ends of the blades 102 for attaching the blades 102 to the shaft 104. The attachment flanges 210 are offset about the centerline of the cross-section 200 with the attachment flange 210 at one end 204 of the blade 102 being offset on the opposite side of the centerline from the attachment flange 210 at the other end 206 of the blade 102 so that the blades 102 can be attached end-to-end with each other at the attachment flanges 210 without creating a step between the leading edges 202 of the blades 102 (See also, FIGS. 5 and 6). The attachment flanges 210 are positioned at an angle with respect to the leading edge 202 of the blade 102 so the blade 102 can be mounted at that angle from vertical ($\beta$) with the leading edge 202 at one end 204 of the blade 102 trailing the leading edge 202 at the other end 206 of the blade 102 as the blade 102 moves around the rotating shaft 104. Orienting the blades 102 at an angle from vertical ($\beta$) further reduces fluid flow resistance to the blades 102 as they rotate, which improves the efficiency of the vertical axis turbine 100.

Figure 3:
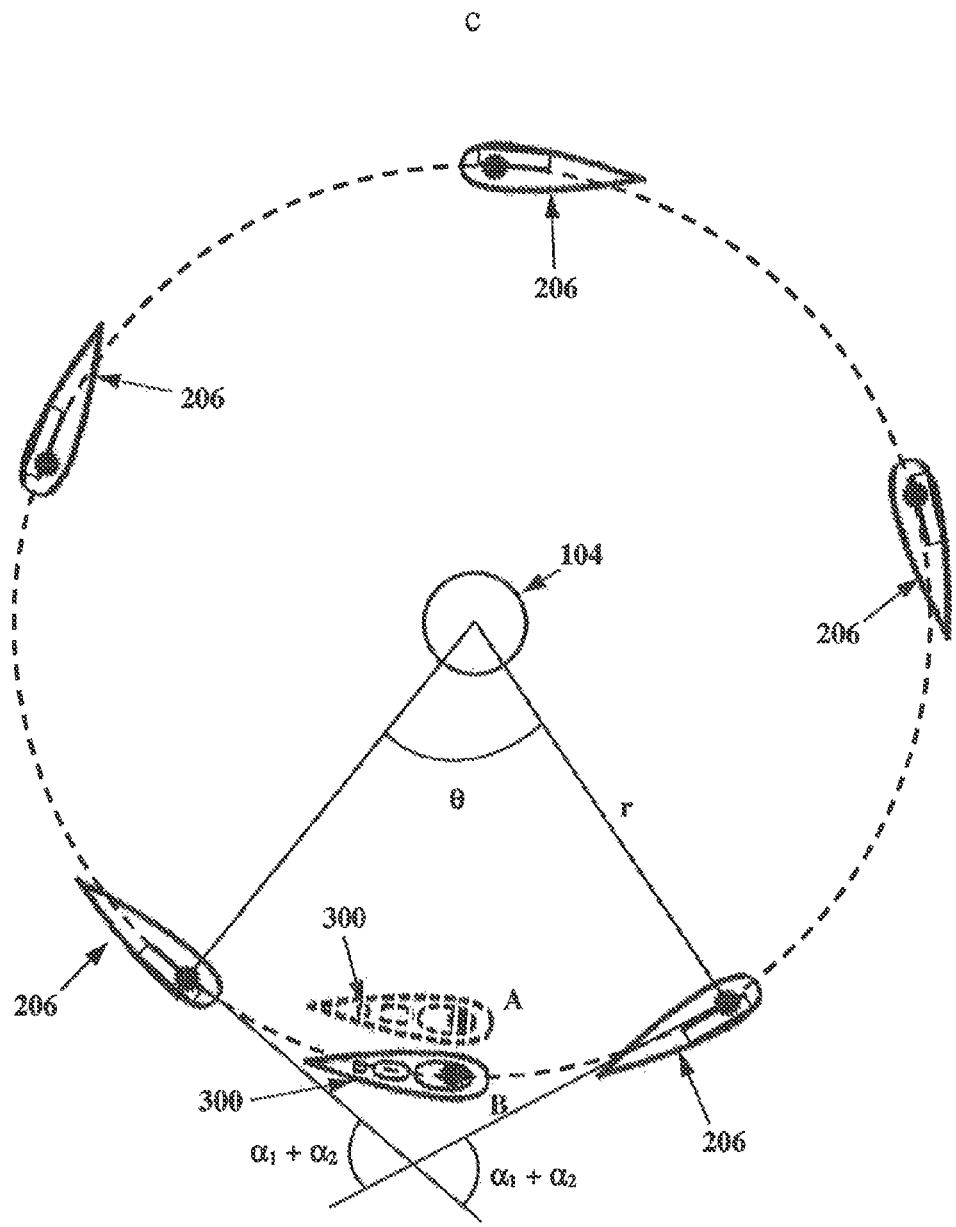
FIG. 3 is a plan view taken along line 3-3 of FIG. 1 illustrating the angular orientation of the blades illustrated in FIG. 1.

When the blades 102 are equally spaced from each other in a substantially circular pattern about the rotating shaft 104, as illustrated in FIGS. 1 and 3, each blade 102 should be at an angle ($\beta$) from vertical sufficient to place the center of pressure 208 at the top end 206 of one blade 102 directly above and behind the center of pressure 208 at the bottom end 204 of the next blade 102 in the circular pattern. The angle from vertical ($\beta$) will depend on the radius (r) of the circular pattern, the length of each blade 102 or one or more blades, and the number (n) of blades 102. Accordingly, the angle from vertical ($\beta$) for each blade 102 can be approximated by using the following equation:

$$\beta = \sin^{-1}[2r\sin(\pi/n)\text{Length}].$$

That orientation ensures that fluid flow is always perpendicular to the center of pressure 208 of at least one point on at least one blade 102 as the blades 102 rotate about the rotating shaft 104, which maximizes thrust while minimizing the accelerations and decelerations that would be caused if the blades 102 were allowed to move in and out of perpendicularity with the direction of fluid flow.

To allow the center of pressure 208 at the top end 206 of one blade 102 to be directly above and behind the center of pressure 208 at the bottom end 204 of the next blade 102 in the circular pattern, the top end 206 of each blade 102 must be twisted in relation to the bottom end 204 of the that blade 102. The angle of twist ($\alpha_1+\alpha_2$) of each blade 102 will depend on the number (n) of blades 102 in the circular pattern. Accordingly, the angle of twist ($\alpha_1+\alpha_2$) for each blade 102 can be approximated by using the following equation:

$$\alpha_1+\alpha_2=\theta=(360°/n).$$

Thus, for a vertical axis turbine 100 having five blades, the angle of twist ($\alpha_1+\alpha_2$) for each blade 102 is 72°. That twist not only ensures that the center of pressure 208 at the top end 206 of one blade 102 will be directly above and behind the center of pressure 208 at the bottom end 204 of the next blade 102 in the circular pattern, it places the top end 206 and bottom end 204 of each blade in an orientation tangent to the blade's 102 path of rotation, further improving the efficiency of the vertical axis turbine 100 by maintaining the proper angle-of-attack at the ends 204 and 206 of each blade 102.

Because the blades 102 are substantially straight, they can be formed from any of a plurality of simple machining processes, such as by continuous extrusion or injection molding.

If each blade 102 were left entirely straight, however, the center of pressure 208 at a central location 300 (e.g., a midpoint along its longitudinal axis) of each straight blade would not be the same distance (r) from the rotating axis 104 as the top end 206 and the bottom end 204 of the blade 102. Instead, as illustrated in FIG. 3, a central location 300 of each straight blade would lie at a first position "A" at the halfway point on a straight line between the top end 206 and the bottom end 204 of the straight blade. Accordingly, each blade 102 is bent, or folded, 212 (dashed line) at a central location 300 when it is formed, such as with a mandrel during extrusion, to relocate that central location of the blade 102 to a second position "B" at the same distance (r) from the rotating axis 104 as the top end 206 and the bottom end 204 of the blade 102. That bend 212 is at an angle with respect to the leading edge 202 of each blade 102 and is parallel to the surface from which the rotating shaft 104 of the vertical axis turbine 100 extends in order to maintain the angle of the leading edge 202 of each blade 102 with respect to the rotating shaft 104.

Figure 4:
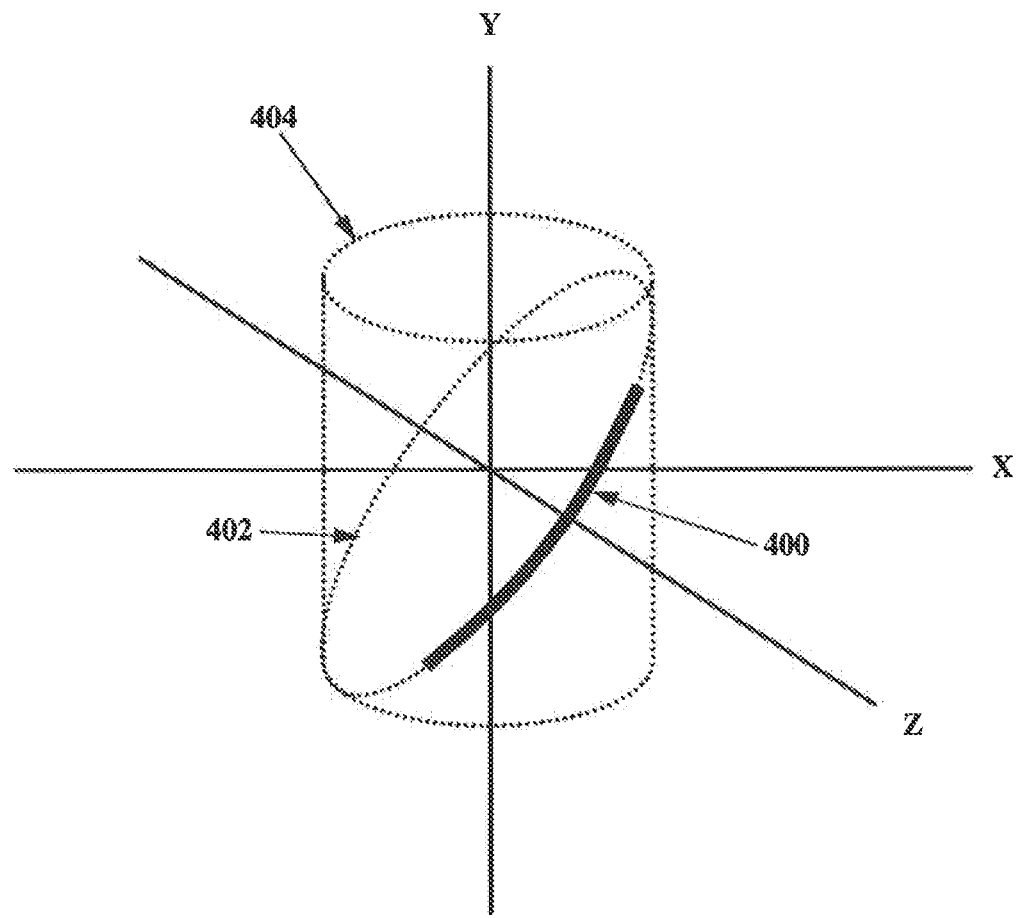
FIG. 4 is an orthogonal view illustrating an exemplary embodiment of the blades of FIG. 1 connected in an end-to-end manner.

As FIG. 4 illustrates, the resulting shape 400 of each blade 102 is effectively that of the major side of an ellipse 402 laid at an angle with respect to the Y-axis. Such an ellipse 402 is created when you cut a cylinder 404 diagonally across its cross-section. Thus, instead of being helical in shape (i.e., circular), the blades 102 of the vertical axis turbine 100 of the present invention are closer to an ellipse as they curve around the rotating shaft 104 (i.e., the Y-axis). And, by positioning a central location 300 of each blade 102 at the sane distance (r) from the rotating axis 104 as the top end 206 and the bottom end 204 of the blade 102, the change in torque as the pressure from fluid flow moves across each blade is significantly reduced, thereby reducing vibrations and making the vertical axis turbine 100 more efficient as with a "true" helical blade. Moreover, that shape closely approximates a "true" helical blade without requiring sophisticated manufacturing techniques and complicated calculations, and without requiring the manufacture of a large number of different, discrete blade members that must be joined together incrementally to approximate a helical blade.

As an alternative to bending each blade 102 as it is formed, two or more blades 102 can be attached to each other end-to-end at points that are the same distance (r) from the rotating axis 104. In that configuration, each of the blades 102 can be formed substantially identical to each other, which provides advantages over other blades that approximate helical blades that require the use of different parameters for each discrete blade member. Moreover, that configuration allows the angle of twist ($\alpha_1 + \alpha_2$) for each blade 102 to be reduced proportionally by the number of blades (b) attached together. For example, in a five-blade configuration as illustrated in FIGS. 1 and 3 formed with two blades 102 (b=2) at each of the blade locations, each individual blade need only be twisted by an angle of 36° (72°/2). A reduction of the angle of twist ($\alpha_1 + \alpha_2$) for each blade further simplifies the forming process for each blade.

Figure 5:
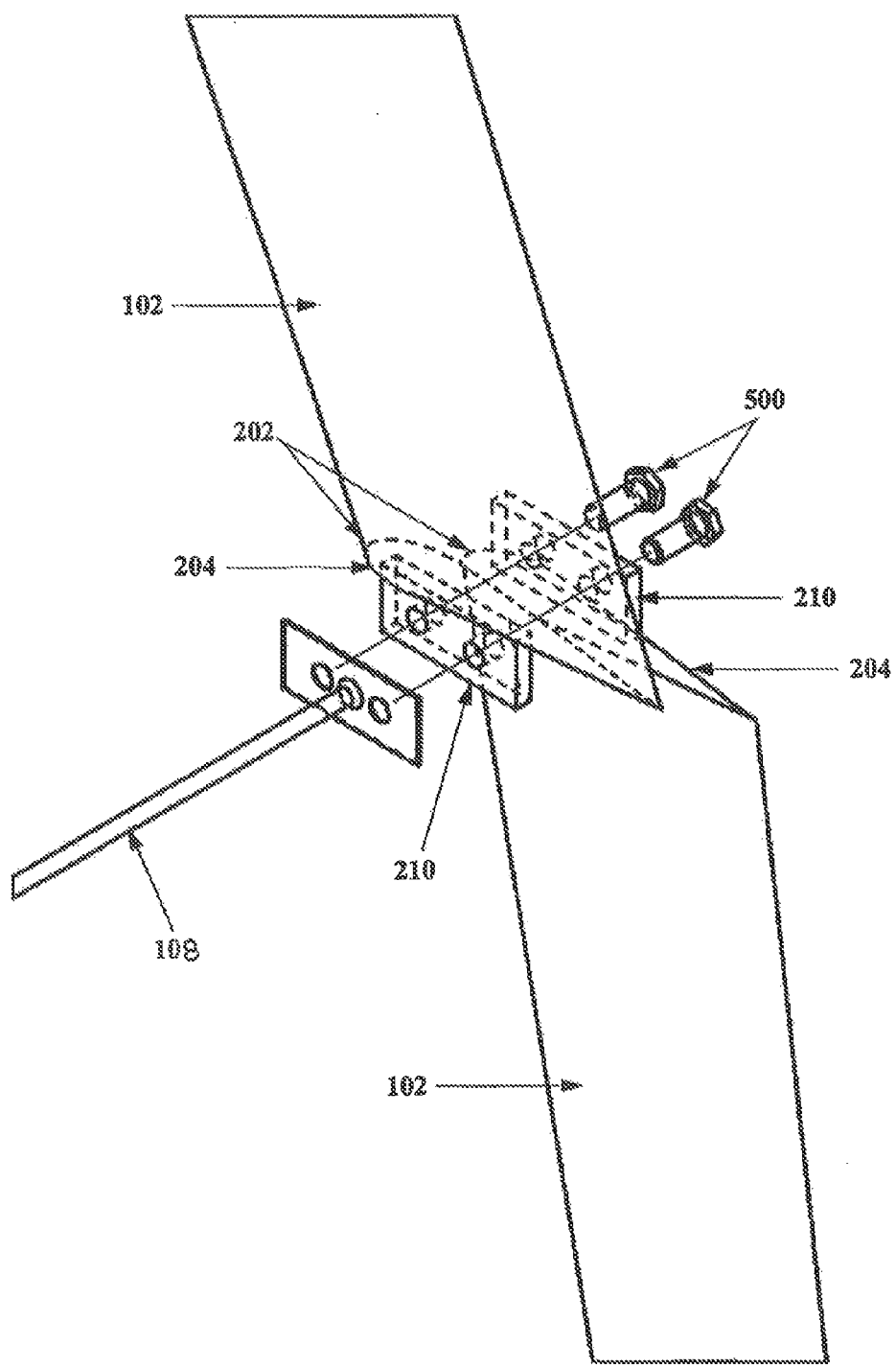
FIG. 5 is an orthogonal view illustrating an exemplary embodiment of the blade of FIG. 2A connected to an angled strut at its distal end.

As FIG. 5 illustrates, two blades 102 are attached together at their respective attachment flanges 210 using standard hex-head fasteners 500. FIG. 5 also illustrates how the attachment flange 210 at the bottom 204 of the upper blade 102 is offset from the attachment flange 210 at the top 206 of the lower blade 102 without creating a step between the leading edges 202 of those blades 102. The blades 102 are also attached to a horizontal strut 108 at the attachment flange 210. The horizontal struts 108 attach the blades 102 to the rotating shaft 104 and hold the connection point of the blades 102 at the same distance (r) from the rotating shaft 102 as the opposing distal ends of those blades 102. Use of hex-head fasteners 500 to attach the blades 102 together in that manner greatly simplifies the fabrication and repair of the vertical axis turbine 100, both in a shop or out in the field. The illustrated hex-head fastener 500 can either be held in place with threaded holes in the horizontal strut 108 or by threaded female fasteners, such as lock-nuts, disposed behind the horizontal strut 108. Although the blades 102 are described as being attached together using hex-head fasteners 500, it will be understood to one of ordinary skill in the art that the blades 102 may also be attached together using any other suitable means, such as welding or gluing.

Figure 6:
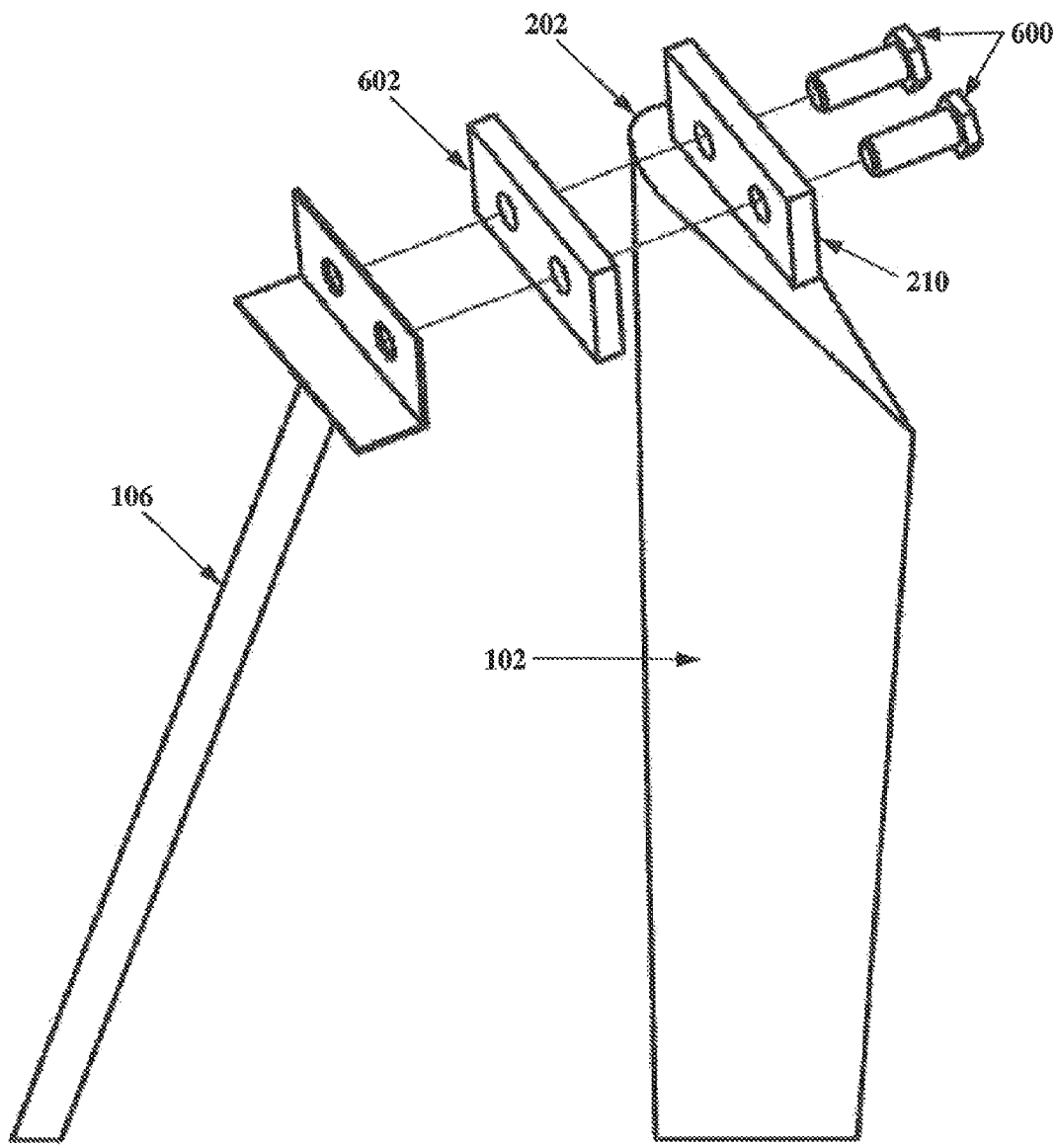
FIG. 6 is an orthogonal view illustrating a rotating shaft according to the vertical axis turbine in FIG. 1.

The distal ends of the blades 102 are attached to the rotating axis 104 in a similar manner as the connection point of the blades 102. As FIG. 6 illustrates, the top 206 of a blade 102 is attached to an angled strut 106 at the attachment flange 210 using hex-head fasteners 600. Those hex-head fasteners 600 function and have the same utility as that described above. To compensate for the offset of the attachment flange 210, a spacer 602 may be installed between the angled strut 106 and the attachment flange 210. That spacer 602 is not needed at the bottom 204 of a blade 102 because the attachment flange 210 at that end of the blade 102 is offset towards the angled strut 106. As described above, offsetting the attachment flanges 210 in that manner allows each blade 102 to be exactly the same, making manufacture of the vertical axis turbine 100 much simpler and less expensive.

The distal ends of the blades 102 may also be attached to each other using horizontal struts 110 in a similar manner to that by which they are attached to the rotating shaft 104. Those horizontal struts 110 can extend from blade-to-blade in any suitable configuration, such as a star-shaped pattern, to add rigidity to the vertical axis turbine 100. Each of the struts 106, 108, and 110 is exactly the same as the others in that group (i.e., the angled struts 106 are all the same, the first horizontal struts 108 are all the same, and the second horizontal struts are all the same), further simplifying the manufacture of the vertical axis turbine 100 and reducing its overall cost. Such struts 106-110 give the vertical axis turbine 100 structural strength and integrity. As an alternative to struts 106-110, however, the blades 102 may also be attached to the rotating shaft 104 and/or each other by any other suitable means, such as a single central disc, radial spokes, or the like.

Figure 7:
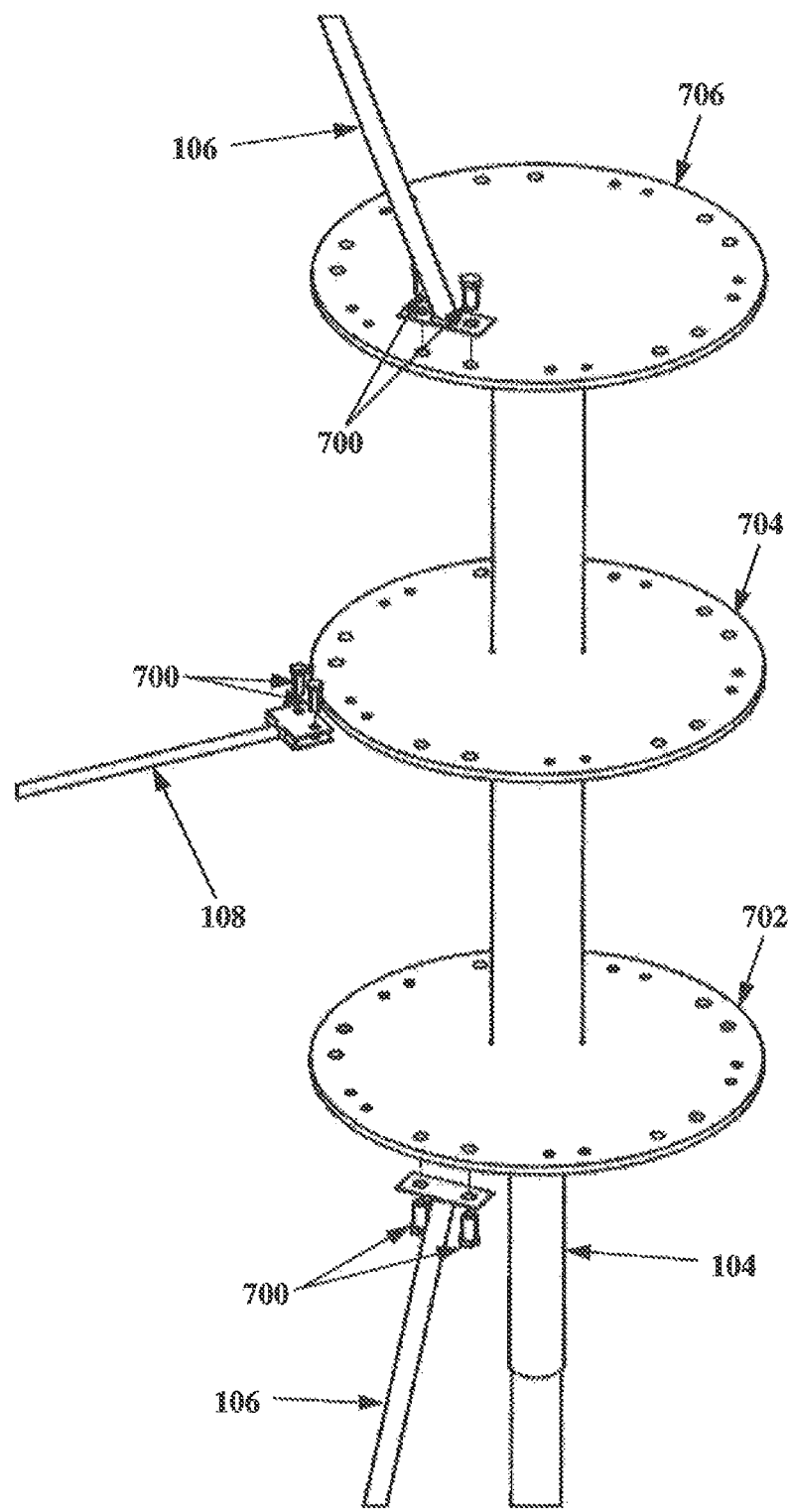
FIG. 7 is an orthogonal view illustrating a generator hosing frame according to the vertical axis turbine in FIG. 1.

As FIG. 7 illustrates, the angled struts 106 and horizontal struts 108 are also attached to the rotating shaft 104 with hex-head fasteners 700. Those hex-head fasteners 700 also function and have the same utility as that described above. The rotating shaft 104 includes three circular flanges 702-706 extending radially therefrom. The struts 106 and 108 are installed around the circumference of the flanges 702-706 with equal spacing according to how many blades 102 are installed on the rotating shaft 104, with the horizontal struts located half way between the angled struts 108 so as to be in position to attach to a central location 300 on a blade 102. Thus, in the five-blade configuration illustrated in FIGS. 1 and 3, each angled strut 106 is located 72° from the preceding angled strut 106 on its respective flange 702 or 706, each horizontal strut 104 is located 72° from the preceding horizontal strut 104 on its respective flange 704, and each angled strut 106 is 36° from the preceding horizontal strut 106. And, because each blade 102 is at an angle from vertical ($\beta$) with the top 206 of one blade 102 being located directly above and behind the bottom 204 of the next blade 102, the bottom 204 of each blade 102 will be attached to an angled strut 106 on the bottom flange 702 that is located at a position 72° from an angled strut 106 on the top flange 706 attached to the top 206 of that same blade 102, with a horizontal strut 108 on the middle flange 704 attached to a central location 300 on that blade 102 at a position therebetween (i.e., 36° from each of those angled struts 106).

As FIG. 8 illustrates, the rotating shaft 104 also includes an engagement end 800 for engaging a direct drive generator 802 mounted in the generator housing frame 114. The efficiency and rotational speeds achieved by the vertical axis turbine 100 of the present invention allow it to be coupled directly to a direct drive generator 802 without the need for additional generator gearing. The direct drive generator 802 is attached to the generator housing frame 114 and the generator housing frame 114 is attached to the fixed mast 112 using hex-head fasteners 804. Those hex-head fasteners 804 also function and have the same utility as that described above.

The generator housing frame 114 includes a pair of bearings 806—one at the top of the generator housing frame 114 and one located beneath the direct drive generator 802 (not shown)—for rotatably holding the rotating shaft 104 in the vertical position. Accordingly, the engagement end 800 of the rotating shaft 104 extends through the direct drive generator 802 to engage a bearing 806 below it, which allows the engagement end 800 of the rotating shaft to engage the rotor of the direct drive generator 802 while being supported by the bearing 806 below it. That configuration helps reduce wear on the direct drive generator 802 that could be caused from the torques applied to the rotating shaft 104 by the blades 102.

The topmost members 808 of the generator housing frame 114 are angled so that the generator housing frame 114 can be located between the blades 102 of the vertical axis turbine 100. As illustrated in FIG. 1, the angle of the topmost members 808 corresponds to the angle at which the angled struts 106 extend from the rotating shaft 104 so that there is sufficient clearance between the angled struts 106 and the generator housing frame 114 as the blades 102 rotate around the generator housing frame 114. That configuration allows a shorter rotating shaft 104 to be used, which decreases the potentially damaging forces that can be applied to the rotating shaft 104 and cause it to shear. That configuration also places the direct drive generator 802 between the blades 102, creating a centralized rotating to further reduce vibration and wear and increase efficiency. And, that configuration allows the direct drive generator 802 to be used as a flywheel and a motor to keep the centralized mass of the vertical axis turbine 100 rotating as fluid flow decreases, eliminating the amount of energy needed for increasing momentum when fluid flow increases again. Moreover, design and construction of the vertical axis turbine 100 are simplified by allowing fixed masts 112 of different lengths to be used interchangeably with the existing components of the vertical axis turbine 100 without the need to modify or add any other components.

The unique blade configuration of the vertical axis turbine 100 of the present invention ensures that a portion of the blades 102 are always positioned optimally with respect to fluid flow, thereby creating maximum thrust to spin the blades 102 about the rotating shaft 104. By angling the blades so that the center of pressure 208 at the top end 206 of one blade 102 is directly above and behind the center of pressure 208 at the bottom end 204 of the next blade 102 in the circular pattern, the vertical axis turbine 100 is able to maintain a continuous speed of rotation without the vibrations caused by accelerations and decelerations as the blades 102 pass between the least and most efficient thrust zones. Moreover, that blade configuration also allows the blades 102 of the present invention to be manufactured inexpensively without the use of complex curves that require sophisticated manufacturing techniques. The unique blade configuration of the vertical axis turbine 100 of the present invention also enables the vertical axis turbine 100 to be self-starting.

Although a five-blade configuration is described, virtually any number of blades 102 can be utilized in the vertical axis turbine 100. Preferably, an odd number of blades 102 will always be utilized to minimize torque pulses and to prevent the negative effects of wind shadows than can occur with an even number of blades. The larger the number of blades 102, the more stable the vertical axis turbine 100 will remain if one blade 102 is lost, for example, in high winds. In addition, although a single bend, or two-blade per five blade positions, configuration is described, any number of bends or blades-per-blade-position can be utilized. A larger number of bends or blades-per-blade-position allows for the use of more horizontal struts 108 because those struts are typically attached at the bends or connection points in the blades 102, making that configuration particularly suited for stronger fluid flow applications (e.g., hurricane force winds). In addition, the vertical axis turbine 100 can include a mixture of left-handed and right-handed blades 102 and/or multiple layers of blades 102. The specific configuration of the vertical axis turbine 100 will ultimately depend on the fluid flow conditions in which it is to be used.

To provide additional advantages in weight and efficiency, the blades of the present invention can be constructed like bird bones—meaning that each blade 102 can be formed with voids 214 (FIG. 2D) of varying dimensions therein. That structure imparts lightness, rigidity, and strength exceeding that of a solid material. Such a structure can be achieved, for example, by inserting a linked set of hollow shapes into a die during an extrusion process or by introducing a solid shape into the die at varying intervals and injecting an inert gas in the voids 214 as the solid shape is removed to make sure the void doe not collapse during cooling. The voids can also be formed as part of an injection molding process. The shapes of the voids 214 are engineered to distribute forces efficiently in the material so that the final shape of each blade 102 has the characteristics of a lightweight bird bone. Each blade 102 can also be constructed using standard techniques with continuous shaped voids 214 going from one end 204 of the blade 102 to the other end 206 of the blade 102. After forming, the ends of the blades 102 are capped off with any suitable shaped cap and an attachment flange 210.

The blades 102 may be formed from any suitable extrudable material or composite. In a preferred embodiment, the material is a mix of metallized carbon and fiberglass that is electrically conductive and exhibits the properties of an antenna when a current is applied but is transparent to radar when no current is applied. Similar to an airplane wing, that feature allows the vertical axis turbine 100 to conduct harmful current to ground without harming the blades 102 if they are struck by lightning while otherwise allowing the vertical axis turbine 100 to maintain a minimal radar footprint (e.g., smaller than the cross-sectional area of the circular pattern of blades 102). The rotating shaft 104 can also be tuned to mask a radar image. Accordingly, the vertical axis turbine 100 of the present invention is particularly suited for use near radar-sensitive areas, such as airports. The same benefits may also be achieved by using specialty plastics.

By making each of the blades 102 and struts 106-110 the same within their respective groups, the vertical axis turbines 100 of the present invention can be easily assembled and maintained. Moreover, that interchangeability makes the vertical axis turbine 100 of the present invention modular. Accordingly, an entire power system can be assembled from those modular components. Such a power system can exploit a common rotating shaft 104 and direct drive generator 802 for any number of blade modules. For example, blade modules can stacked end-to-end vertically with the direction of the blades 102 alternating with each blade module such that one blade module is left-handed and an adjacent blade module is right-handed. The rotating shaft 104 can then be configured to counter-rotate for each blade module to maximize the energy generated from a fluid flow. Such vertically stacked blade modules may also be lined up horizontally side-by-side to effectively create a wall of vertical axis turbines 100 that exploits 100% of the rectangular swept cross-sectional area of that wall.

Accordingly, the vertical axis turbine 100 of the present invention provides a quiet, efficient, unidirectional turbine that can operate at high speeds with minimal vibrations and that is easy and inexpensive to maintain and manufacture.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A turbine comprising a plurality of elliptical blades rotatably disposed around an axis of rotation, wherein:
   each of the plurality of elliptical blades has an elliptical shape that is approximated by two or more substantially straight blade portions extending between distal ends and one or more central locations of that elliptical blade;
   each of the two or more blade portions is substantially straight along its longitudinal axis, has a foil cross section along its longitudinal axis, is twisted about its longitudinal axis by a first angle; and
   the one or more central locations of each of the plurality of elliptical blades is disposed at a same distance from the axis of rotation as the distal ends of the plurality of elliptical blades when that elliptical blade is disposed at a second angle with respect to the axis of rotation.

2. The turbine of claim 1, wherein:
   each of the two or more substantially straight blade portions of each of the plurality of elliptical blades has the same length.

3. The turbine of claim 2, wherein:
   the second angle is approximated by the equation $$\beta = \sin^{-1}[2r \cdot \sin(\pi/n)/\text{Length}],$$

wherein $\beta$ is the first angle, r is a predetermined distance at which the distal ends and the one or more central locations are disposed from the axis of rotation, n is a number of elliptical blades disposed around the axis of rotation, and Length is a length of each of the two or more blade portions.

4. The turbine of claim 1, further comprising:
   a direct drive generator installed within the plurality of elliptical blades at the axis of rotation.

5. The turbine of claim 4, wherein:
   the direct drive generator is configured to be used as a flywheel to maintain momentum of the plurality of elliptical blades when fluid flow decreases.

6. The turbine of claim 1, further comprising:
   a plurality of struts that attach at least the distal ends of each of the plurality of elliptical blades to a rotating shaft at the axis of rotation.

7. The turbine of claim 6, further comprising:
   a plurality of struts that attach each of the plurality of elliptical blades to the rotating shaft at the one or more central locations of each of the plurality of elliptical blades.

8. The turbine of claim 1, wherein each of the two or more blade portions of each of the plurality of elliptical blades is detachably connected end-to-end to each blade portion of that elliptical blade at each of the one or more central locations of that elliptical blade.

9. The turbine of claim 1, wherein each of the two or more blade portions is formed by extruding each of the plurality of elliptical blades and curving that elliptical blade at each of the one or more central locations of that elliptical blade as that elliptical blade is extruded.

10. The turbine of claim 1, wherein:
    the first angle is approximately 360° divided by the number of elliptical blades disposed around the axis of rotation, further divided by the number of blade portions in each of the plurality of elliptical blades.

11. The turbine of claim 1, wherein:
    disposing each of the plurality of elliptical blades at the second angle results in a top distal end of each of the plurality of elliptical blades being directly above and behind a bottom distal end of a preceding elliptical blade.

12. The turbine of claim 1, wherein each of the plurality of blades further comprises a plurality of voids formed therein.

13. The turbine of claim 1, wherein:
    the foil cross section is symmetrical.

* * * * *